(12) United States Patent
Kulikovskyi et al.

(10) Patent No.: US 12,294,646 B2
(45) Date of Patent: May 6, 2025

(54) METHOD FOR EXCHANGING DATA BETWEEN DEVICES AND SYSTEM FOR PERFORMING SAME METHOD

(71) Applicant: Samsung Electronics Co., Ltd., Suwon-si (KR)

(72) Inventors: Valentyn Kulikovskyi, Kyiv (UA); Oleksandr Sholudko, Kyiv (UA); Andrii Krenevych, Kyiv (UA)

(73) Assignee: Samsung Electronics Co., Ltd., Suwon-si (KR)

( * ) Notice: Subject to any disclaimer, the term of this patent is extended or adjusted under 35 U.S.C. 154(b) by 187 days.

(21) Appl. No.: 17/994,816

(22) Filed: Nov. 28, 2022

(65) Prior Publication Data

US 2023/0092347 A1    Mar. 23, 2023

Related U.S. Application Data

(63) Continuation of application No. PCT/KR2020/008118, filed on Jun. 24, 2020.

(30) Foreign Application Priority Data

May 28, 2020    (KR) .......................... 10-2020-0064595

(51) Int. Cl.
*H04L 9/08*    (2006.01)
*G06F 3/01*    (2006.01)
(Continued)

(52) U.S. Cl.
CPC ............ *H04L 9/0866* (2013.01); *G06F 3/017* (2013.01); *H04L 9/3231* (2013.01); *H04L 9/40* (2022.05)

(58) Field of Classification Search
CPC .......... H04L 9/3231; H04L 9/40; G06F 3/017
(Continued)

(56) References Cited

U.S. PATENT DOCUMENTS

| 7,174,567 B2 | 2/2007 | Keramane |
| 7,506,161 B2 * | 3/2009 | Mizrah ................. H04L 9/3273 713/168 |

(Continued)

FOREIGN PATENT DOCUMENTS

| KR | 10-2013-0132543 A | 12/2013 |
| KR | 10-1738467 B1 | 5/2017 |
| KR | 10-2018-0010006 A | 1/2018 |

OTHER PUBLICATIONS

Tor Anders Johansen, 'Identity management in future personalized service environments', University of Oslo Department of informatics, Master thesis, Apr. 30, 2010.

(Continued)

*Primary Examiner* — Dant B Shaifer Harriman
(74) *Attorney, Agent, or Firm* — Jefferson IP Law, LLP

(57) ABSTRACT

A method of exchanging data between devices is provided. The method includes a first device detecting a user's intention to transmit data, generating first identification information for the data by using biometric data obtained from the user, and transmitting the data and the first identification information to a personalized cloud storage, and a second device detecting the user's intention to receive the data, generating second identification information by using the biometric data obtained from the user, requesting the personalized cloud storage for the data by using the second identification information, and receiving and storing the data from the personalized cloud storage.

18 Claims, 16 Drawing Sheets

(51) Int. Cl.
    *H04L 9/32*     (2006.01)
    *H04L 9/40*     (2022.01)

(58) Field of Classification Search
    USPC .................................................... 713/155
    See application file for complete search history.

(56) References Cited

U.S. PATENT DOCUMENTS

| | | | |
|---|---|---|---|
| 8,600,409 B2 | 12/2013 | Li et al. | |
| 9,258,299 B2* | 2/2016 | Derek | ............... G06F 21/606 |
| 9,465,974 B2 | 10/2016 | Kerr | |
| 9,553,916 B2 | 1/2017 | Ram | |
| 9,954,828 B1* | 4/2018 | Chandrasekhar | ..... H04L 9/0894 |
| 10,867,062 B2* | 12/2020 | Balijepalli | .......... H04L 63/0807 |
| 11,888,850 B2* | 1/2024 | Jain | ....................... H04L 9/3234 |
| 2002/0071567 A1* | 6/2002 | Kurn | ....................... H04L 9/085 |
| | | | 713/155 |
| 2002/0150241 A1* | 10/2002 | Scheidt | ................ H04L 9/3033 |
| | | | 713/180 |
| 2004/0098589 A1* | 5/2004 | Appenzeller | ......... H04L 9/3073 |
| | | | 713/170 |
| 2005/0246763 A1 | 11/2005 | Corcoran et al. | |
| 2006/0242693 A1* | 10/2006 | Kussmaul | ............... G06F 21/32 |
| | | | 726/9 |
| 2009/0287930 A1* | 11/2009 | Nagaraja | ............... H04L 9/3073 |
| | | | 380/255 |
| 2011/0047463 A1* | 2/2011 | Shepherd | ............... G06Q 10/10 |
| | | | 715/723 |
| 2012/0096368 A1* | 4/2012 | McDowell | ............. G06F 9/543 |
| | | | 726/1 |
| 2013/0013986 A1 | 1/2013 | Kim | |
| 2013/0219345 A1* | 8/2013 | Saukko | ................ H04M 1/724 |
| | | | 715/863 |
| 2013/0262858 A1* | 10/2013 | Neuman | ................... H04L 9/30 |
| | | | 713/155 |
| 2013/0285894 A1* | 10/2013 | Marti | ..................... G06V 40/28 |
| | | | 345/156 |
| 2013/0290710 A1* | 10/2013 | Broder | .................. G06Q 30/04 |
| | | | 713/168 |
| 2013/0304815 A1 | 11/2013 | Puente et al. | |
| 2014/0129843 A1* | 5/2014 | Shi | ......................... G06F 21/32 |
| | | | 713/182 |
| 2014/0267339 A1 | 9/2014 | Dowd et al. | |
| 2015/0106770 A1* | 4/2015 | Shah | ....................... G06F 3/017 |
| | | | 715/863 |
| 2016/0105285 A1* | 4/2016 | Jakobsson | ............. H04L 9/0866 |
| | | | 713/186 |
| 2017/0085562 A1* | 3/2017 | Schultz | ............... G06V 40/1371 |
| 2017/0134560 A1* | 5/2017 | Barnes | .................. H04W 4/023 |
| 2017/0230343 A1 | 8/2017 | Dowd et al. | |
| 2018/0262495 A1 | 9/2018 | Xiao | |
| 2018/0309581 A1* | 10/2018 | Butler | ................. H04L 63/0861 |
| 2019/0215164 A1* | 7/2019 | Hamann | ................ H04L 9/0894 |
| 2019/0303928 A1* | 10/2019 | Kaladgi | ................ G06Q 20/385 |
| 2020/0076605 A1* | 3/2020 | Narendra | .............. H04L 9/3231 |
| 2021/0067509 A1* | 3/2021 | Lin | ..................... H04L 63/0853 |
| 2021/0399887 A1* | 12/2021 | Oliveira | ................ H04L 9/0866 |
| 2023/0060150 A1* | 3/2023 | Chen | ........................ G06T 11/00 |
| 2023/0290208 A1* | 9/2023 | McNulty | .................. G07C 9/37 |
| 2024/0364526 A1* | 10/2024 | Waugh | .................. H04L 9/3247 |

OTHER PUBLICATIONS

Vivo's Apex concept phone has a 'half-screen' fingerprint scanner and a retracting selfie camera, Feb. 2018 (=https://www.theverge.com/circuitbreaker/2018/2/25/17051692/vivo-apex-concept-phone-half-screen-fingerprint-scanner-selfie-camera-mwc-2018).

International Search Report dated Feb. 22, 2021, issued in International Patent Application No. PCT/KR2020/008118.

Korean Office Action dated Nov. 11, 2024, issued in Korean Application No. 10-2020-0064595.

* cited by examiner

CLOUD CLIPBOARD

ACTIVATION OF DEVICE-TO-DEVICE
COPY-PASTE SERVICE

METHOD FOR EXCHANGING DATA BETWEEN DEVICES AND SYSTEM FOR PERFORMING SAME METHOD

CROSS-REFERENCE TO RELATED APPLICATION(S)

This application is a continuation application, claiming priority under § 365(c), of an International application No. PCT/KR2020/008118, filed on Jun. 24, 2020, which is based on and claims the benefit of a Korean patent application number 10-2020-0064595, filed on May 28, 2020, in the Korean Intellectual Property Office, the disclosure of which is incorporated by reference herein in its entirety.

BACKGROUND

1. Field

The disclosure relates to a method of exchanging data between devices and a system for performing the method. More particularly, the disclosure relates to a method of exchanging data between devices without a separate registration procedure by using a personalized cloud storage and a user's biometric information, and a system for executing the method.

2. Description of Related Art

It is very simple to copy data and paste the data to another place by using a clipboard on the same device.

However, copying and pasting data between different devices is inconvenient in that a separate service program, such as social networking service (SNS) or e-mail, or a data sharing service must be used.

If data can be simply copied and pasted as in a copy and paste method using a clipboard on different devices, user convenience will be greatly improved.

The above information is presented as background information only to assist with an understanding of the disclosure. No determination has been made, and no assertion is made, as to whether any of the above might be applicable as prior art with regard to the disclosure.

SUMMARY

Data can be simply copied and pasted on different devices as in a copy and paste method using a clipboard.

Aspects of the disclosure are to address at least the above-mentioned problems and/or disadvantages and to provide at least the advantages described below. Accordingly, an aspect of the disclosure is to provide a method of exchanging data between devices, the method including a first device detecting a user's intention to transmit data, generating first identification information for the data by using biometric data obtained from the user, and transmitting the data and the first identification information to a personalized cloud storage, and a second device detecting the user's intention to receive the data, generating second identification information by using the biometric data obtained from the user, requesting the personalized cloud storage for the data by using the second identification information, and receiving and storing the data from the personalized cloud storage.

Additional aspects will be set forth in part in the description which follows and, in part, will be apparent from the description, or may be learned by practice of the presented embodiments.

In accordance with an aspect of the disclosure, a method of exchanging data between devices is provided. The method includes a first device detecting a user's intention to transmit data, generating first identification information for the data by using biometric data obtained from the user, transmitting the data and the first identification information to a personalized cloud storage, and a second device detecting an intention of the user to receive the data, generating second identification information by using the biometric data obtained from the user, requesting the personalized cloud storage for the data by using the second identification information, and receiving and storing the data from the personalized cloud storage.

The generating of the first identification information may include generating a first private key by using the biometric data obtained from the user, and encrypting the data by using the generated first private key.

The generating of the second identification information may include generating a second private key by using the biometric data obtained from the user, and the receiving and storing of the data from the personalized cloud storage may include decrypting the data by using the second private key.

The biometric data may be data obtained by recognizing at least one of a fingerprint, a face, or an iris of the user.

The biometric data may be prohibited from being read and stored by another application or another device.

Use or non-use of the data exchange method may be managed in settings of the first device or the second device.

The detecting of the user's intention to transmit the data may include receiving the user's input of tapping the data.

The personalized cloud storage may receive and store the data and the first identification information from the first device, receive a request for the second identification information and the data from the second device, and, when the second identification information is identical with the first identification information, transmit the data to the second device.

In accordance with another aspect of the disclosure, a data exchange system is provided. The data exchange system includes a personalized cloud storage, a first device configured to detect a user's intention to transmit data, generate first identification information for the data by using biometric data obtained from the user, and transmit the data and the first identification information to the personalized cloud storage, and a second device configured to detect the user's intention to receive the data, generate second identification information by using the biometric data obtained from the user, request the personalized cloud storage for the data by using the second identification information, and receive and store the data from the personalized cloud storage.

The first device may generate a first private key by using the biometric data obtained from the user, and encrypt the data by using the generated first private key.

The second device may generate a second private key by using the biometric data obtained from the user, and decrypt the data by using the generated second private key.

The biometric data may be at least one of a fingerprint, a face, or an iris of the user.

The biometric data may be prohibited from being read and stored by another application or another device.

Use or non-use of the data exchange system may be managed in settings of the first device or the second device.

The first device may detect the user's intention to transmit the data by receiving the user's input of tapping the data.

The second device may detect the user's intention to receive the data by receiving the user's input of tapping a location where to receive the data.

The personalized cloud storage may receive and store the data and the first identification information from the first device, and, in response to a request for the second identification information and the data from the second device, may match the second identification information with the first identification information and transmit the data to the second device.

In accordance with another aspect of the disclosure, a method, performed by a personalized cloud storage, of exchanging data between devices, is provided. The method includes receiving, from a first device, first identification information generated using biometric data of a user of the first device and data, storing the data and the first identification information, receiving, from a second device, a request for second identification information generated using biometric data of a user of the second device and the data, and comparing the second identification information with the first identification information, and transmitting the data to the second device when the second identification information is identical with the first identification information.

In accordance with another aspect of the disclosure, a computer program product, when executed by a computer, causes the above-described methods to be executed.

In accordance with another aspect of the disclosure, a computer-readable recording medium has recorded thereon the computer program product.

Data may be simply copied and pasted on different devices as in a copy and paste method using a clipboard, thus improving user convenience.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1:
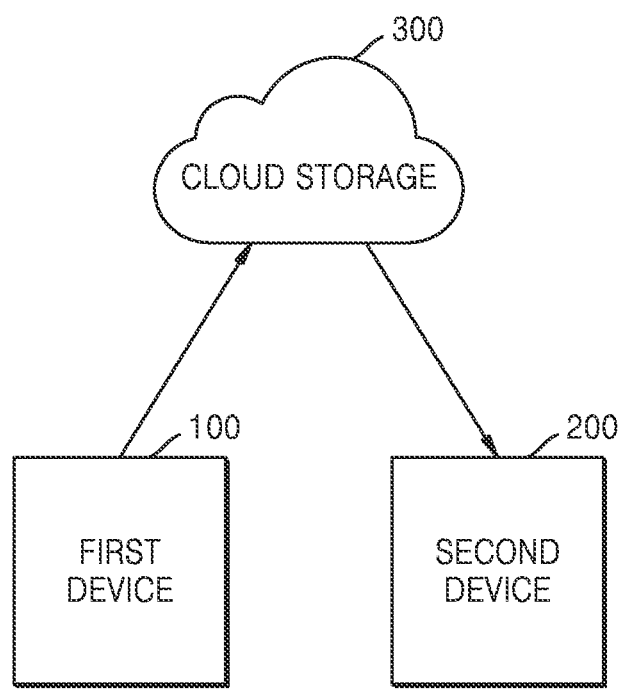
FIG. 1 is a structural diagram of a system for performing data exchange between devices, according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

The terms "comprises" and/or "comprising" or "includes" and/or "including" when used in this specification, specify the presence of stated elements, but do not preclude the presence or addition of one or more other elements.

Embodiments of the disclosure are described in detail herein with reference to the accompanying drawings so that this disclosure may be easily performed by one of ordinary skill in the art to which the disclosure pertains. In the drawings, parts irrelevant to the description are omitted for simplicity of explanation.

FIG. 1 is a structural diagram of a system for performing data exchange between devices, according to an embodiment of the disclosure.

Referring to FIG. 1, the data exchange system according to an embodiment of the disclosure may include a first device 100, a second device 200, and a cloud storage 300.

In the disclosure, a first device 100 and a second device 200 may be all electronic devices capable of Internet connection, including mobile devices (such as, smartphones, notebook computers, and smart pads) or wired devices (such as, desktops, smart televisions (TVs), and various home appliances).

In an embodiment, the first device 100 and the second device 200 may be the same types of devices or different types of devices.

In another embodiment, the first device 100 and the second device 200 may belong to the same types of owners or different types of owners.

In still another embodiment, the first device 100 and the second device 200 only have to be connected to the Internet for data exchange, and there is no need to subscribe to a separate third-party service such as an SNS or a data sharing service, and any connection between device owners is not needed.

In the disclosure, the first device 100, serving as a source device, may detect a user's intention to transmit data, obtain biometric data from a user of the first device 100, generate first identification information about data by using the obtained biometric data, and transmit the data and the first identification information to the cloud storage 300.

In the disclosure, the second device 200, serving as a destination device, may detect a user's intention to receive data, obtain biometric data from a user of the second device 200, generate second identification information by using the obtained biometric data, request a cloud storage for data by using the second identification information, receive the data from the cloud storage, and store the received data.

In the disclosure, the cloud storage 300 may be a personalized cloud storage.

In an embodiment, the cloud storage 300 may be available according to device default settings without a separate user registration procedure.

In an embodiment, the cloud storage 300 may receive the data and the first identification information from the first device 100 and store the received data and the received first identification.

In a situation in which the cloud storage 300 receives a request for the second identification information and the data from the second device 200, and when the second identification information and the first identification information are matched with each other to be identical to each other, the cloud storage 300 may transmit the data to the second device 200.

The first device 100, the second device 200, and the cloud storage 300 may be connected to a network through wireless communication or wired communication to communicate with each other.

The wireless communication may use, as a cellular communication protocol, at least one of long-term evolution (LTE), LTE advance (LTE-A), code division multiple access (CDMA), wideband CDMA (WCDMA), universal mobile telecommunications system (UMTS), wireless broadband (WiBro), or global system for mobile communications (GSM). The wireless communication may include, for example, short-range communication. The short-range communication may include at least one of wireless fidelity (Wi-Fi), Bluetooth, near field communication (NFC), or a global navigation satellite system (GNSS). The GNSS may include, according to regions or bandwidths, at least one of global positioning system (GPS), Glonass (Russian global navigation satellite system), Beidou navigation satellite system (BDS), or Galileo system (European global satellite-based navigation system).

The wired communication may include at least one of universal serial bus (USB), high definition multimedia interface (HDMI), recommended standard 232 (RS-232), plain old telephone service (POTS), and the like. The network may include a telecommunications network, for example, at least one of a computer network (e.g., a local area network (LAN) or a wide area network (WAN)), Internet, a telephone network, and the like.

Figure 2:
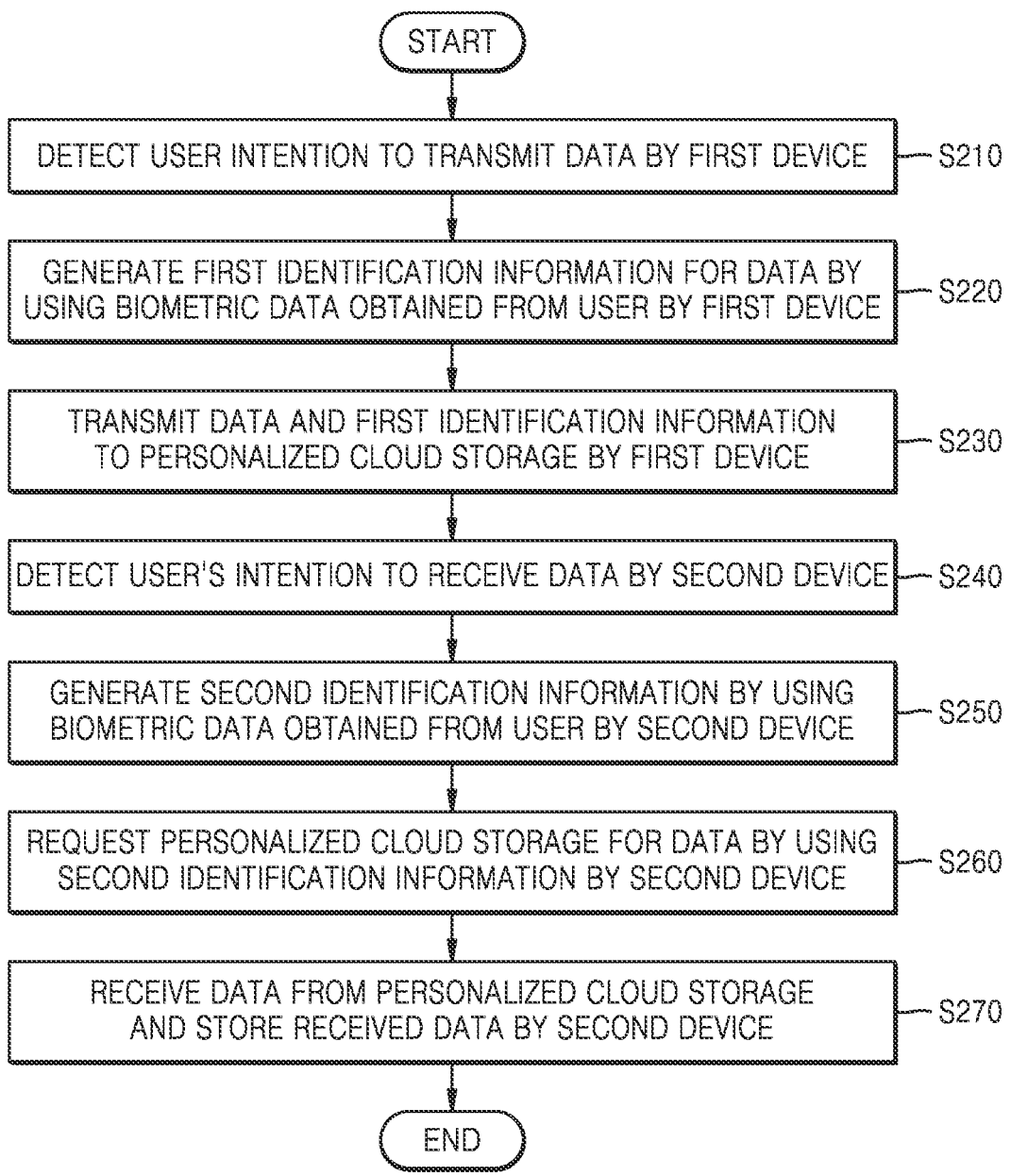
FIG. 2 is a flowchart of a method of data exchange between devices, according to an embodiment of the disclosure.

FIG. 2 is a flowchart of a method of data exchange between devices, according to an embodiment of the disclosure.

Referring to FIG. 2, in operation S210, the first device 100 may detect a user intention to transmit data.

According to an embodiment, a user's intention to transmit data may be detected by receiving a user input selected through a tap, a long tap, or a right-click of at least a portion of data.

According to an embodiment, the user's intention to transmit data may be detected by receiving a predetermined user motion.

A method of detecting the user's intention to transmit data is not limited to the above description, and a first device may detect the user's intention to transmit data in various ways.

In operation S220, the first device 100 may generate first identification information for the data by using biometric data obtained from the user.

The first device 100 may obtain the user's biometric data through a camera, various sensors, and a touch screen included in the first device 100.

The first identification information generated using the obtained biometric data may be combined with the data and used to identify the data.

In operation S230, the first device 100 may transmit the data and the first identification information to the personalized cloud storage 300.

According to an embodiment, the first device 100 may combine the data with the first identification information and may transmit a result of the combination to the cloud storage 300.

In operation S240, the second device 200 may detect a user's intention to receive data.

According to an embodiment, the user's intention to receive data may be detected by receiving a user input selected through a tap, a long tap, or a right-click of a location where to receive the data.

The user's intention to receive data may be detected by receiving a predetermined user motion.

A method of detecting the user's intention to receive data is not limited to the above description, and a second device may detect the user's intention to receive data in various ways.

In operation S250, the second device 200 may generate second identification information by using the biometric data obtained from the user.

In an embodiment, the second device 200 may obtain the user's biometric data through a camera, a touch screen, and the like included in the second device 200.

In another embodiment, the biometric data obtained by the second device 200 may be of the same type as the biometric data obtained by the first device 100 in operation S220.

In yet another embodiment, the second identification information generated using the obtained biometric data may be used to identify the data.

In operation S260, the second device 200 may request the personalized cloud storage for the data by using the second identification information.

In operation S270, the second device 200 may receive the data from the personalized cloud storage and store the received data.

Figure 3:
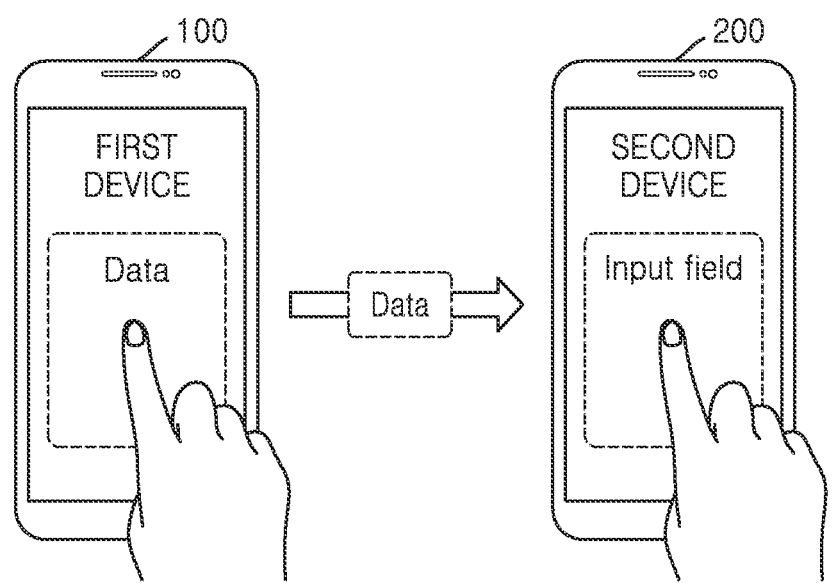
FIG. 3 illustrates a method of data exchange between devices, according to an embodiment of the disclosure.

FIG. 3 illustrates a method of data exchange between devices, according to an embodiment of the disclosure.

Referring to FIG. 3, according to the embodiment, the first device 100 may be a source device and the second device 200 may be a destination device.

A user may tap data in a first device 100 and store the tapped data in a cloud storage 300, in the same way as copying data by using a clipboard on the same device and pasting the copied data to another place, and then may tap an input field on a second device 200 and then paste data copied from the first device 100.

According to the embodiment, user inputs respectively received by the first device 100 and the second device 200 may be the same as a copy and paste operation using a clipboard on the same device.

This method may greatly improve user convenience by making the device-to-device exchange process easy and simple.

Figure 4:
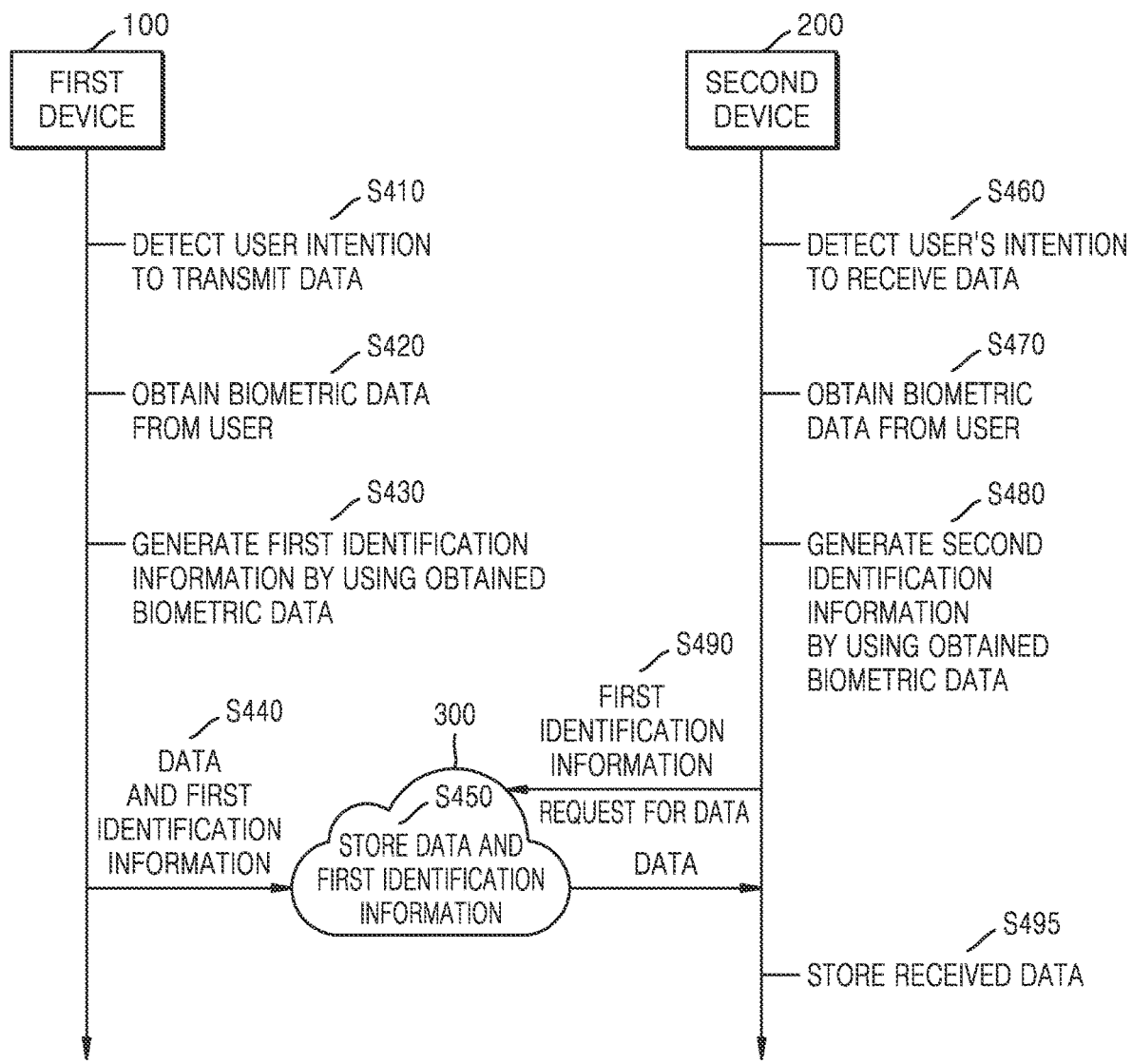
FIG. 4 is a flowchart of a method of data exchange between devices, according to an embodiment of the disclosure.

FIG. 4 is a flowchart of a method of data exchange between devices, according to an embodiment of the disclosure.

Referring to FIG. 4, all features described with reference to the embodiments of FIGS. 1 and 2 may be equally applied to the embodiment.

In operation S410, the first device 100 may detect a user intention to transmit data.

In operation S420, the first device 100 may obtain biometric data of a user.

In operation S430, the first device 100 may generate first identification information for data by using the obtained biometric data.

In operation S440, the first device 100 may transmit the data and the first identification information to the personalized cloud storage 300.

In operation S450, the cloud storage 300 may store the data received from the first device 100, together with the first identification information.

In operation S460, the second device 200 may detect a user's intention to receive data.

In operation S470, the second device 200 may obtain the biometric data from the user.

In operation S480, the second device 200 may generate second identification information by using the obtained biometric data.

In operation S490, the second device 200 may request the cloud storage 300 for data transmitted by the first device 100 while transmitting the second identification information to the cloud storage 300.

In operation S495, the second device 200 may receive the data from the personalized cloud storage and store the received data.

Figure 5:
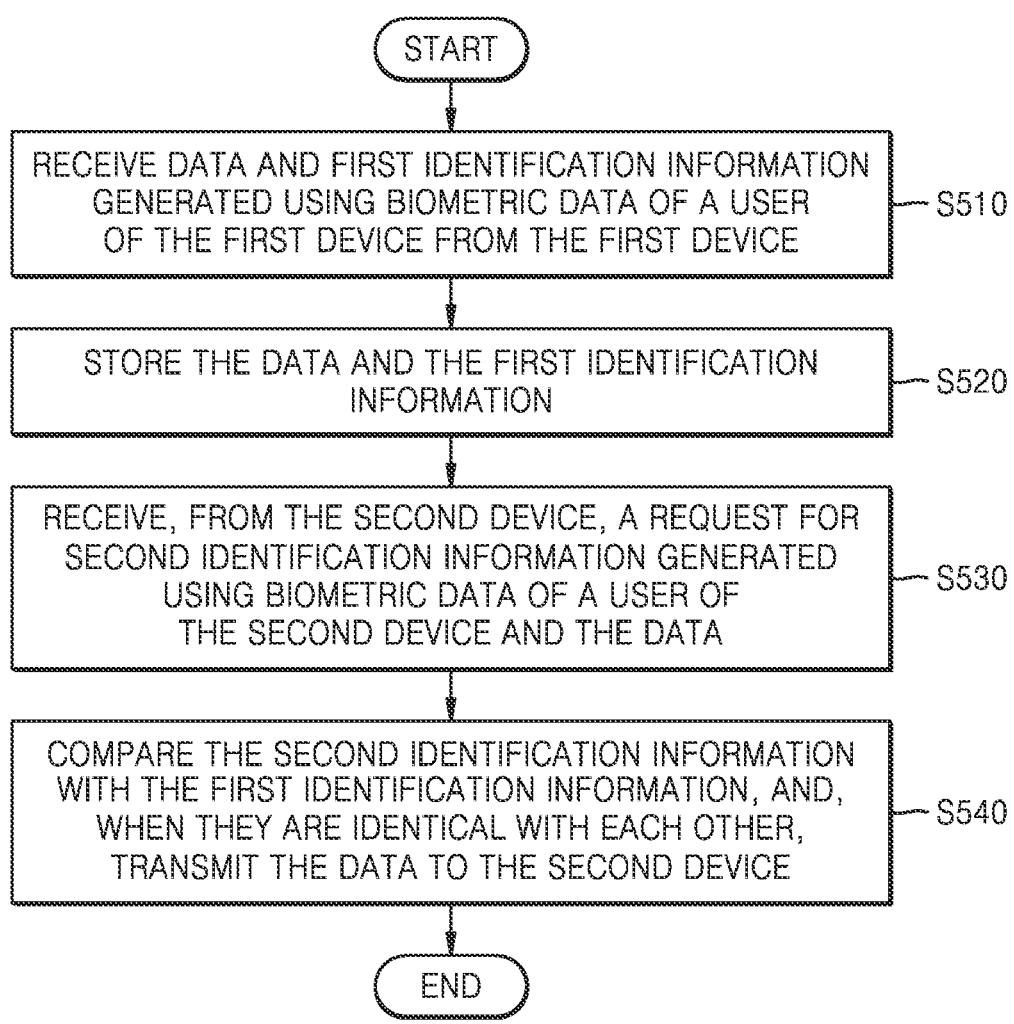
FIG. 5 is a flowchart of a method, performed by a personalized cloud storage, of exchanging data between devices, according to an embodiment of the disclosure.

FIG. 5 is a flowchart of a method, performed by a personalized cloud storage, of exchanging data between devices, according to an embodiment of the disclosure.

Referring to FIG. 5, in operation S510, a cloud storage 300 may receive data from a first device 100 and first identification information generated using biometric data of a user of a first device 100.

In operation S520, the cloud storage 300 may store the data and the first identification information.

The cloud storage 300 may associate the data with the first identification information and may store the association.

In operation S530, the cloud storage 300 may receive, from the second device 200, a request for second identification information generated using biometric data of a user of the second device 200 and the data.

In operation S540, the cloud storage 300 may compare the second identification information with the first identification information, and, when they are identical with each other, may transmit the data to the second device 200.

According to an embodiment, in a situation in which the second identification information is not identical with the first identification information, the cloud storage 300 may not perform any operation or may transmit a failure message.

Figure 6:
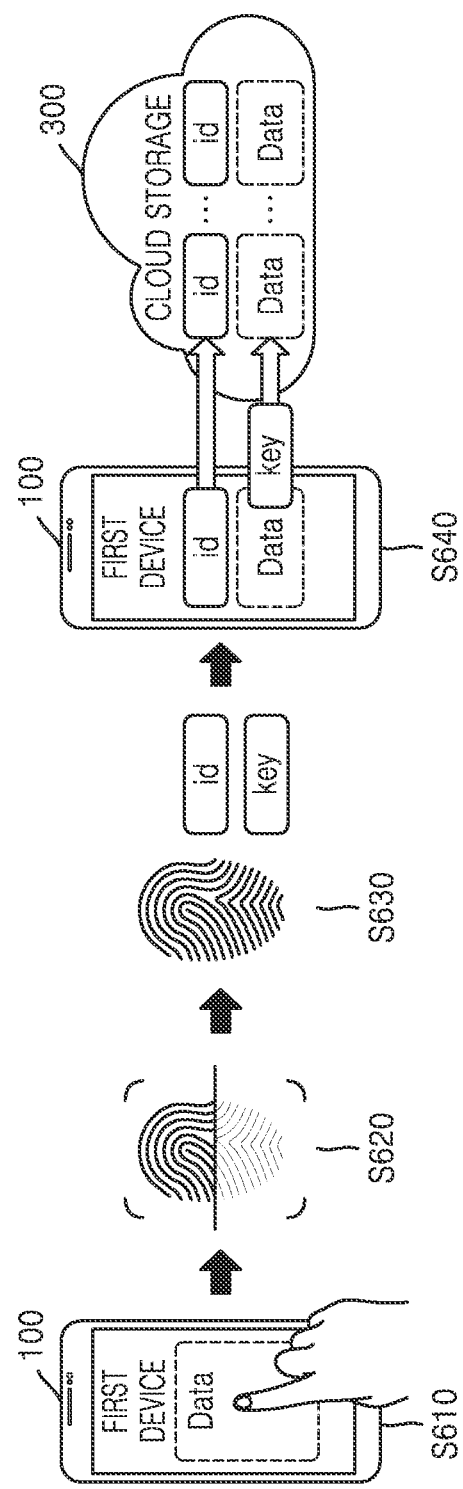
FIG. 6 is a view illustrating a method, performed by a first device, of transmitting data to a cloud storage, according to an embodiment of the disclosure.

FIG. 6 is a view illustrating a method, performed by a first device, of transmitting data to a cloud storage, according to an embodiment of the disclosure.

Referring to FIG. 6, in operation S610, a first device 100 may detect a user's intention to transmit data.

According to an embodiment, a first device 100 may detect a user's intention to transmit data by receiving a user input of tapping at least a portion of data.

In operation S620, the first device 100 may obtain biometric data from the user.

According to another embodiment, the biometric data may be a fingerprint of the user.

The first device 100 may scan the user's fingerprint through a touch screen.

In operation S630, the first device 100 may generate first identification information and a first private key for data by using the obtained biometric data.

The first device 100 may encrypt the data by using the first private key.

According to yet another embodiment, the first private key may be deleted from the first device 100 after the data is encrypted.

In operation S640, the first device 100 may transmit the encrypted data and the first identification information to the personalized cloud storage 300.

Figure 7:
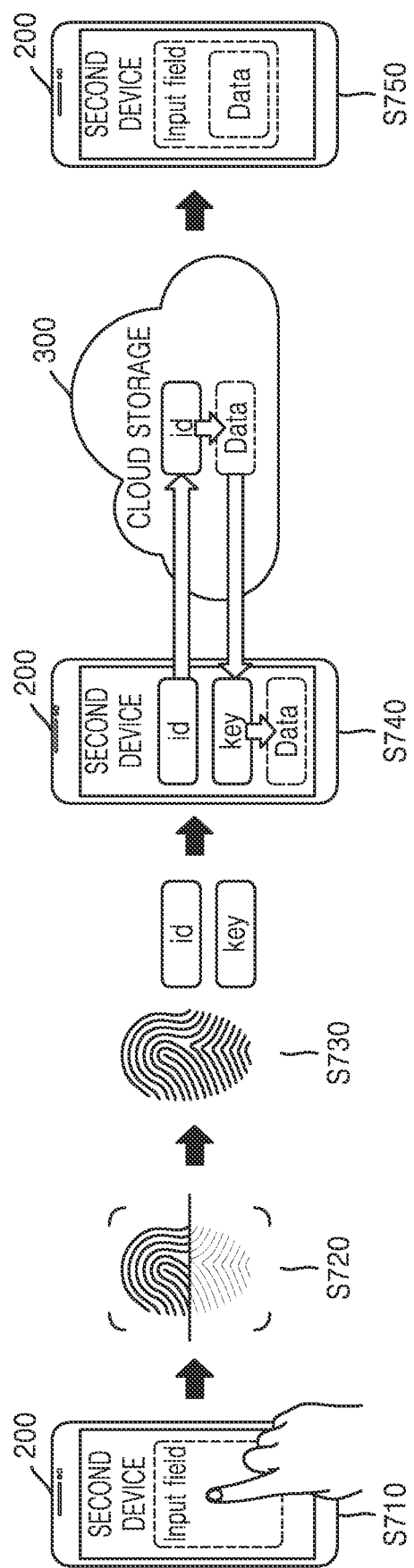
FIG. 7 is a view illustrating a method, performed by a second device, of receiving data from a cloud storage, according to an embodiment of the disclosure.

FIG. 7 is a view illustrating a method, performed by a second device, of receiving data from a cloud storage, according to an embodiment of the disclosure.

Referring to FIG. 7, in operation S710, a second device 200 may detect a user's intention to receive data.

In an embodiment, a second device 200 may detect a user's intention to transmit data by receiving a user input of tapping a location where to receive the data.

In operation S720, the second device 200 may obtain biometric data from the user.

The biometric data obtained by the second device 200 from a user of the second device 200 may be of the same type as the biometric data obtained by the first device 100 from a user of the first device 100.

In another embodiment, the biometric data may be a fingerprint of the user.

The second device 200 may scan the user's fingerprint through a touch screen.

In operation S730, the second device 200 may generate second identification information and a second private key for data by using the obtained biometric data.

In operation S740, the second device 200 may request the cloud storage 300 for data transmitted by the first device 100 while transmitting the second identification information to the cloud storage 300.

In operation S750, the second device 200 may receive the data from the personalized cloud storage and store the received data.

The second device 200 may decrypt the received data by using the second private key generated in operation S730.

In yet another embodiment, the second private key may be deleted from the second device 200 after the data is decrypted.

Figure 8:
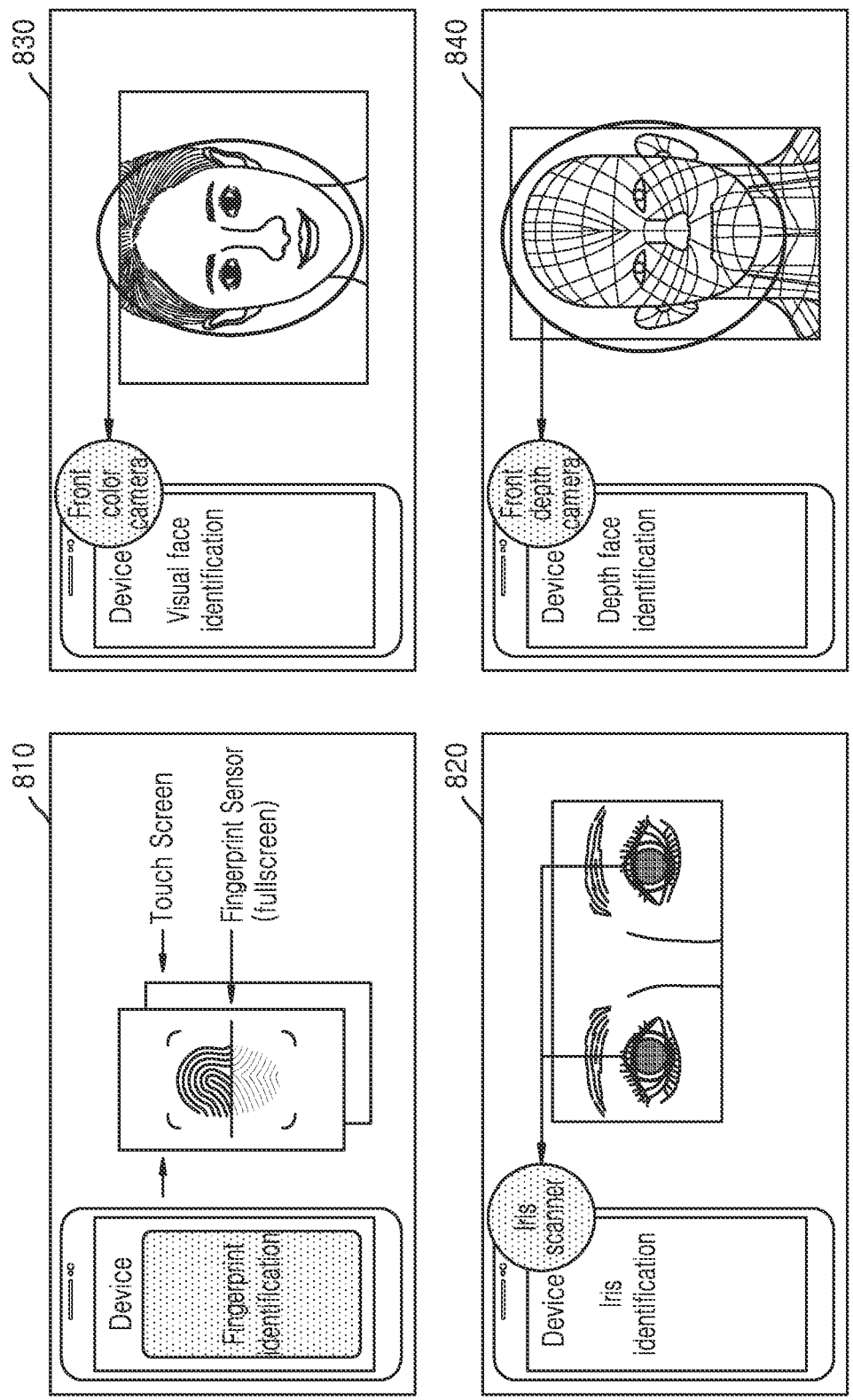
FIG. 8 is a view illustrating user biometric data according to an embodiment of the disclosure.

FIG. 8 is a view illustrating user biometric data according to an embodiment of the disclosure.

Referring to FIG. 8, the biometric data according to the disclosure may be at least one of a user's fingerprint 810, faces 830 and 840, or an iris 820.

According to an embodiment, a first device 100 or a second device 200 may scan the user's fingerprint through a touch screen or a touch pad (810).

According to another embodiment, the first device 100 or the second device 200 may obtain the user's fingerprint through a fingerprint sensor or the like of the entire screen or a portion of the screen (810).

According to yet another embodiment, the first device 100 or the second device 200 may scan the user's iris by using an iris scanner (820).

According to still another embodiment, the first device 100 or the second device 200 may recognize the user's face by using a camera (830 and 840). The first device 100 or the second device 200 may use a visual face identification method 830 or a depth face identification method 840.

Since there is a case where the user's biometric data is obtained from a public device or another person's device, the user's biometric data needs to be protected from the public device or another person's device.

According to an embodiment, another application of a user device may attempt to access the user's biometric data.

Accordingly, the first device 100 or the second device 200 may prohibit reading and storing of biometric data by another application or another device to prevent the other application or the other device from accessing the biometric data obtained from the user.

Figure 9:
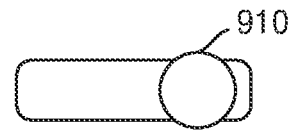
FIG. 9 is a view illustrating a user interface for selecting whether to use a method of exchanging data between devices from device settings, according to an embodiment of the disclosure.

FIG. 9 is a view illustrating a user interface for selecting whether to use a method of exchanging data between devices from device settings, according to an embodiment of the disclosure.

Referring to FIG. 9, in order to use a method of exchanging data between devices according to the disclosure, a first device 100 or a second device 200 does neither need to subscribe to a data sharing service or the like provided by a third party in advance nor directly establish a connection with each other.

A first device 100 or a second device 200 may only be connected to a network. When the method of exchanging data between devices, that is, a device-to-device copy-paste service, is activated in the device settings, the first device 100 or the second device 200 may use the method of exchanging data between devices according to the disclosure.

Activation or non-activation of the device-to-device copy-paste operation service may be changed in device settings, like a smartphone user determining whether to use Wi-Fi in settings. For example, a button (910) of FIG. 9 for changing an activation or non-activation of the device-to-device copy-paste operation service can be provided.

Figure 10:
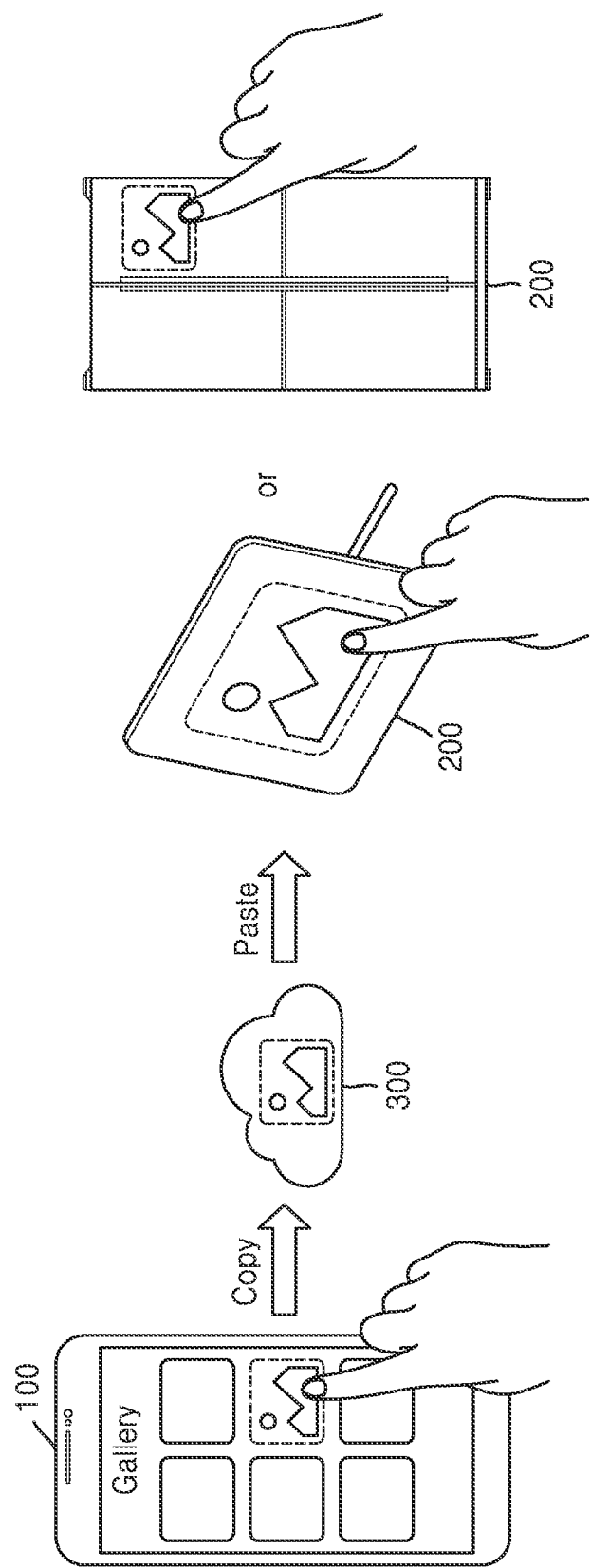
FIG. 10 is a view illustrating a method of exchanging data between devices, according to an embodiment of the disclosure.

FIG. 10 is a view illustrating a method of exchanging data between devices, according to an embodiment of the disclosure.

Referring to FIG. 10, according to the embodiment, a first device 100 such as a smartphone may easily transmit a picture taken during travel or living to a second device 200, such as a digital picture frame or a smart refrigerator, through a cloud storage 300.

In an embodiment, a user may complete the photo transfer between devices with just two tapping operations.

In another embodiment, a first tapping operation may be performed on a photo selected from the photo album of the smartphone (i.e. the first device 100), and a second tapping operation may be performed on the screen of the digital picture frame (i.e., the second device 200) or the smart refrigerator (i.e., the second device 200).

In still another embodiment, data exchanged between devices may be in various forms such as a moving picture, a link, text, and the like.

The second device 200 may be any of various devices such as an IoT device, another smartphone of the user, a notebook computer, or a smart pad.

Figure 11:
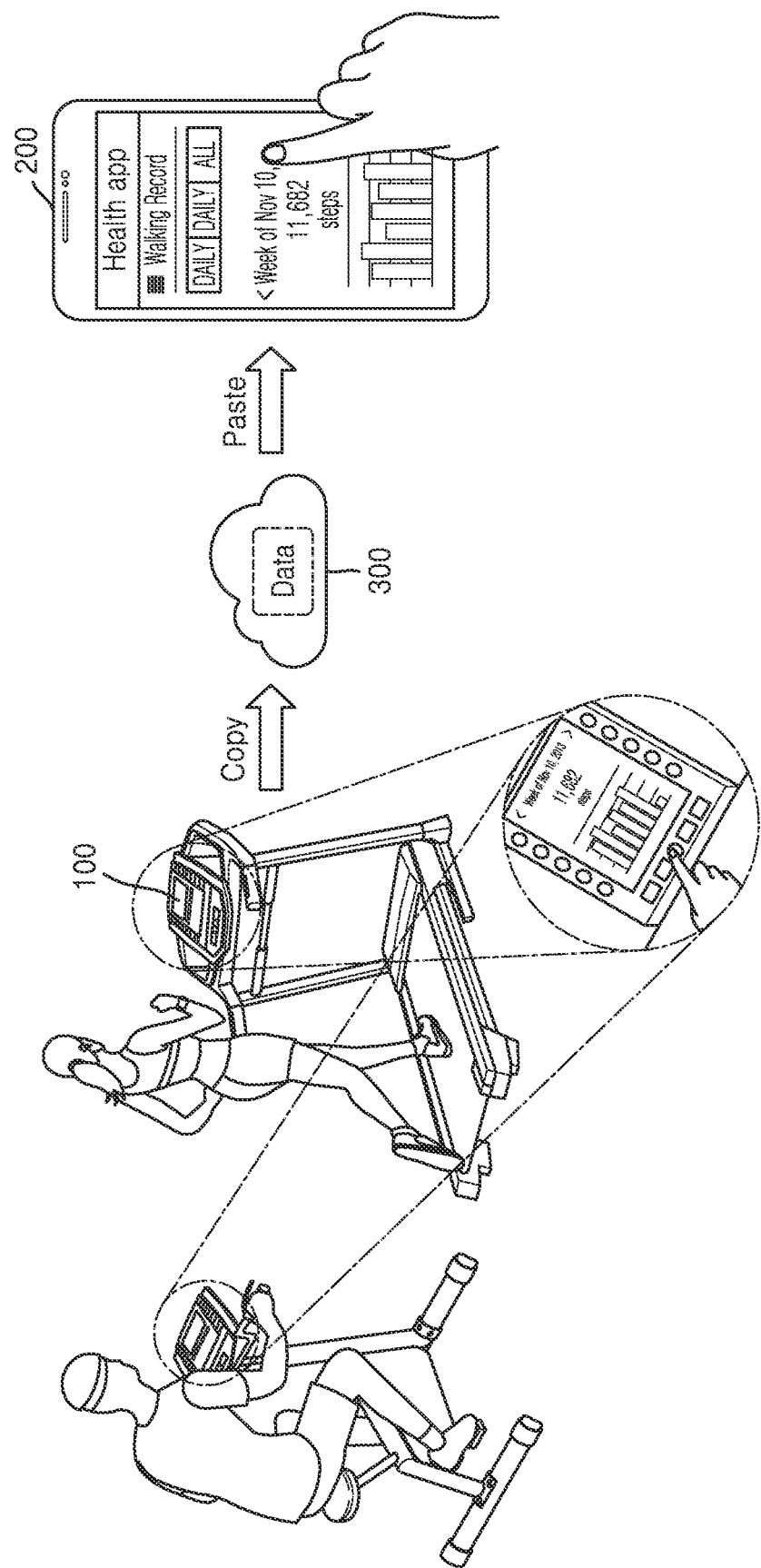
FIG. 11 is a view illustrating a method of exchanging data between devices, according to an embodiment of the disclosure.

FIG. 11 is a view illustrating a method of exchanging data between devices, according to an embodiment of the disclosure.

Referring to FIG. 11, according to the embodiment a first device 100 may be an exercise device of a fitness center, and a second device 200 may be a personal device such as a user's smartphone or laptop computer.

In an embodiment, the user may easily transmit information valuable to the user and input into the public exercise device (i.e., a first device 100) of the fitness center to the personal device (i.e., a second device 200), such as a smartphone or a laptop computer, through the cloud storage 300.

The user may complete information transfer between devices with just two tapping operations.

A first tapping operation may be performed on the information valuable to the user on the screen of the public exercise device (i.e., the first device 100), and a second tapping operation may be performed on the screen of the smartphone (i.e., the second device 200) or the notebook computer (i.e., the second device 200).

In another embodiment, personal information may be deleted from the information valuable to the user, and the information valuable to the user without personal information may be stored in the public exercise device (i.e., the first device 100).

Figure 12:
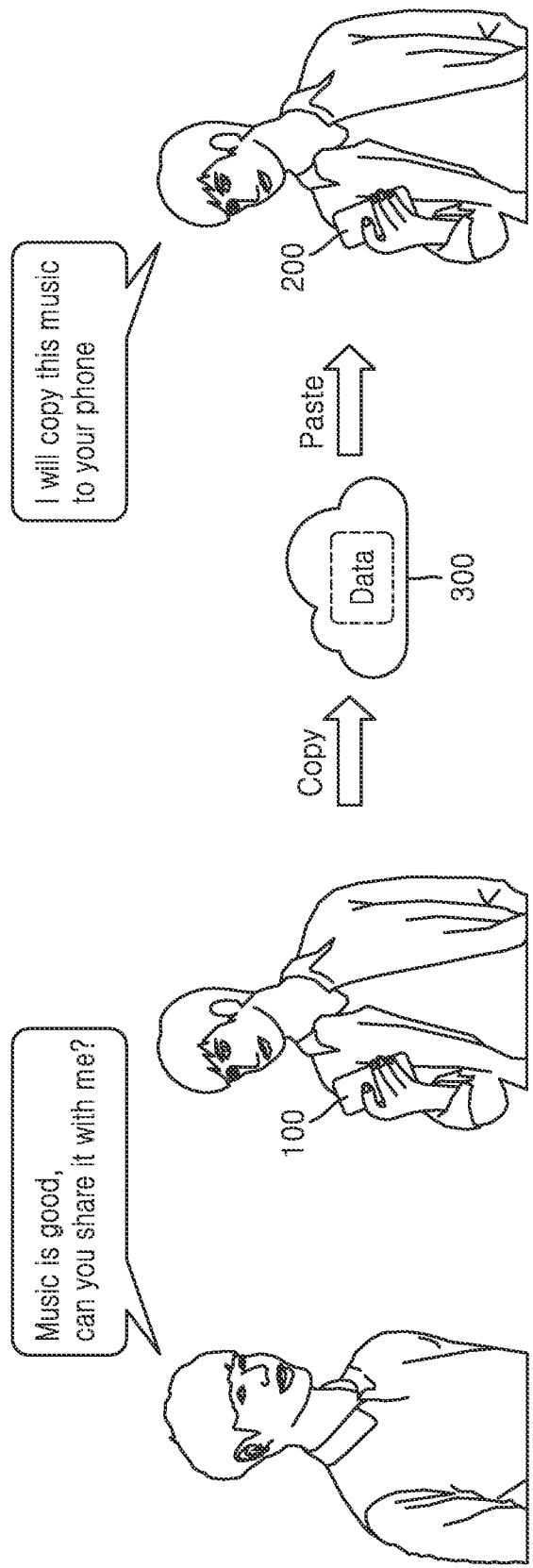
FIG. 12 is a view illustrating a method of exchanging data between devices, according to an embodiment of the disclosure.

FIG. 12 is a view illustrating a method of exchanging data between devices, according to an embodiment of the disclosure.

Referring to FIG. 12, in a public place, user A may accidentally hear good music.

The user A may request user B, who is the owner of a first device 100 through which music is played, to share the music.

The user B may tap the music played back by his/her smartphone (i.e., a first device 100) to transmit the music to a cloud storage 300, and tap the screen of the user A's smartphone (i.e., a second device 200) to transmit the music from the cloud storage 300 to the user A's smartphone (i.e., the second device 200), thereby easily share the music to the user A through two tapping operations.

According to an embodiment, the user A and the user B may meet each other for the first time.

According to another embodiment, data exchanged between devices is not limited to music, and the first device 100 and the second device 200 are not limited to smartphones either.

Figure 13:
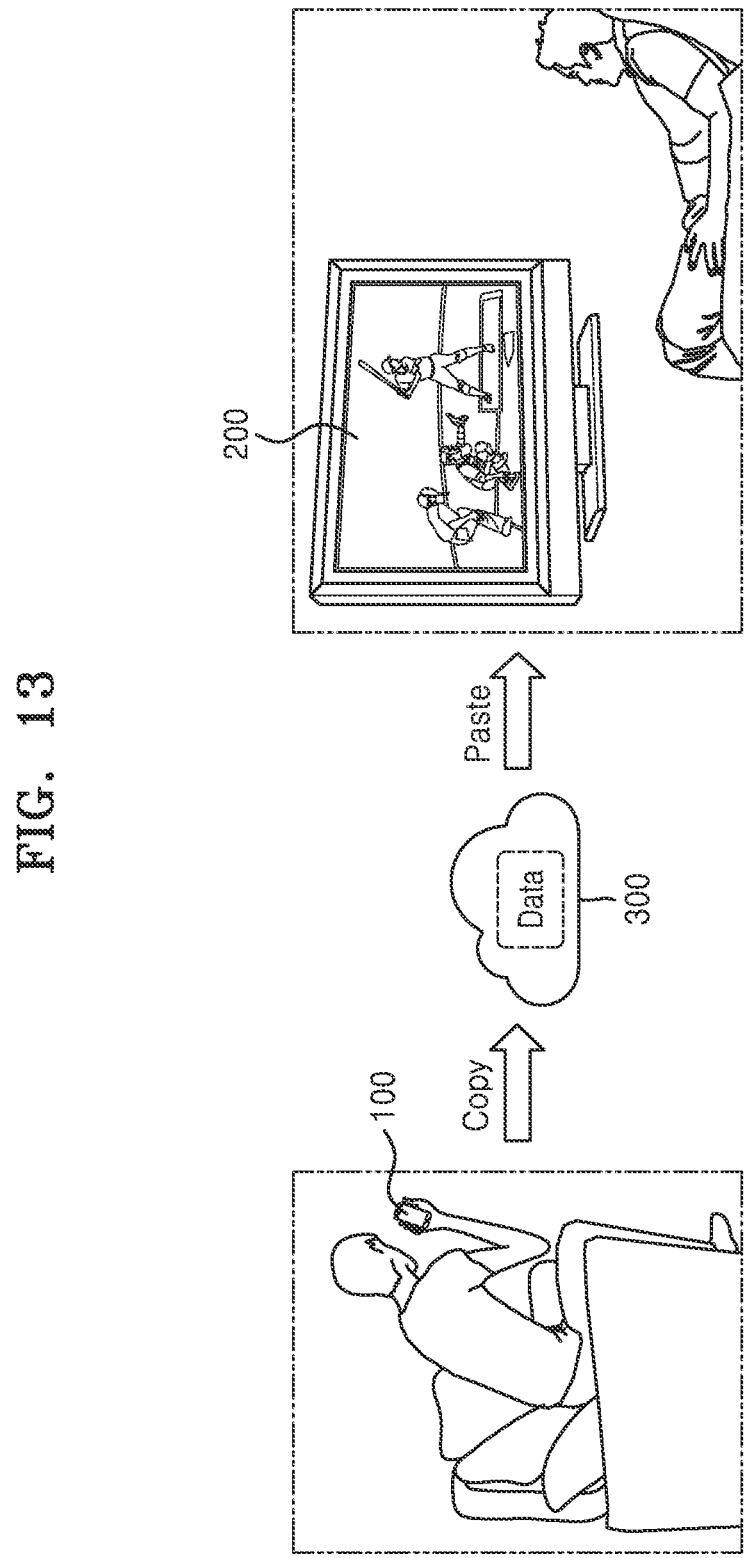
FIG. 13 is a view illustrating a method of exchanging data between devices, according to an embodiment of the disclosure.

FIG. 13 is a view illustrating a method of exchanging data between devices, according to an embodiment of the disclosure.

Referring to FIG. 13, according to the embodiment, a user may share and watch content, such as a baseball game watched through a smartphone (i.e., a first device 100), on a smart TV (i.e., a second device 200) or a big screen (i.e., the second device 200) by using a cloud storage 300, together with more people.

The user may share the content of the smartphone (i.e., the first device 100) with the device (i.e., the second device 200) having a large screen through only two tap operations.

According to an embodiment, the user may move the content watched through a TV (i.e., the first device 100) in a room to the TV (i.e., the second device 200) in a living room by using the cloud storage 300 and may watch the content.

According to another embodiment, the user may copy a meeting material from a personal device (i.e., the first device 100) to a screen (i.e., the second device 200) of a presentation room by using the cloud storage 300.

Figure 14:
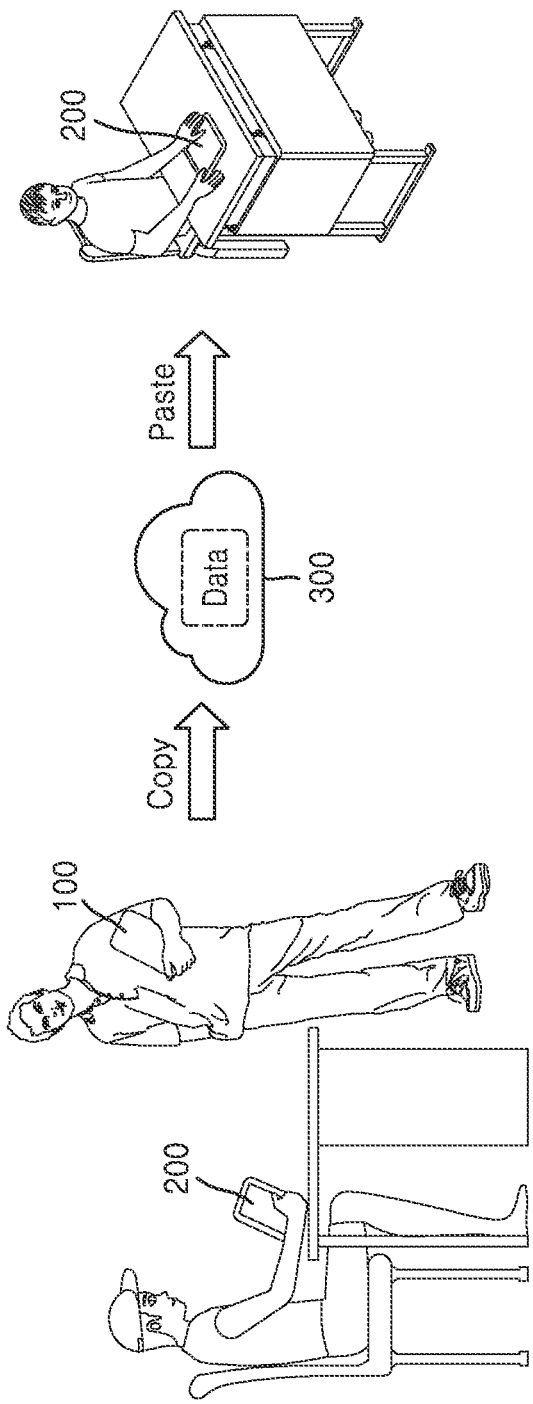
FIG. 14 is a view illustrating a method of exchanging data between devices, according to an embodiment of the disclosure.

FIG. 14 is a view illustrating a method of exchanging data between devices, according to an embodiment of the disclosure.

Referring to FIG. 14, according to the embodiment, a teacher may copy data, such as class materials or assignments, from his/her device (i.e., a first device 100) to a student's device (i.e., a second device 200) by using a cloud storage 300.

According to an embodiment, a student may copy and submit data such as assignments from his/her device (i.e., the first device 100) to a teacher's device (i.e., the second device 200) by using the cloud storage 300.

Such distribution and submission of assignments may be accomplished with just two tapping operations.

Figure 15:
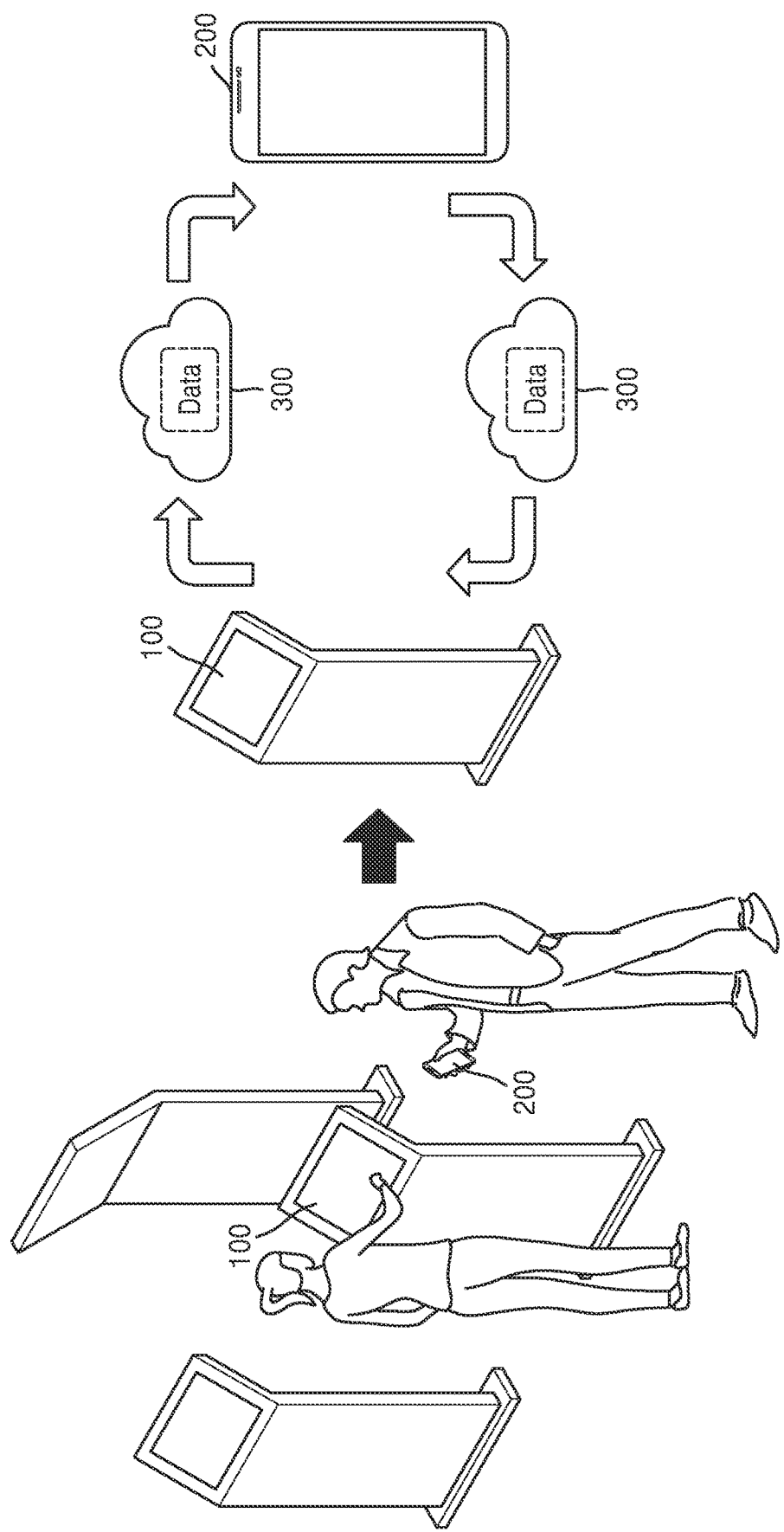
FIG. 15 is a view illustrating a method of exchanging data between devices, according to an embodiment of the disclosure.

FIG. 15 is a view illustrating a method of exchanging data between devices, according to an embodiment of the disclosure.

Referring to FIG. 15, according to the embodiment, a user may copy data, such as a document form and a survey, from a public device (i.e., a first device 100) to a personal device (i.e., a second device 200) using a cloud storage 300.

In an embodiment, the user may conveniently prepare a document in the personal device (i.e., the first device 100) and then submit the same to the public device (i.e., the second device 200) in the same manner as described above.

In another embodiment, the user may copy data, such as navigation information, various ticketing information, and the map of a specific place, from the public device (i.e., the first device 100) to the personal device (i.e., the second device 200) by using the cloud storage 300.

Figure 16:
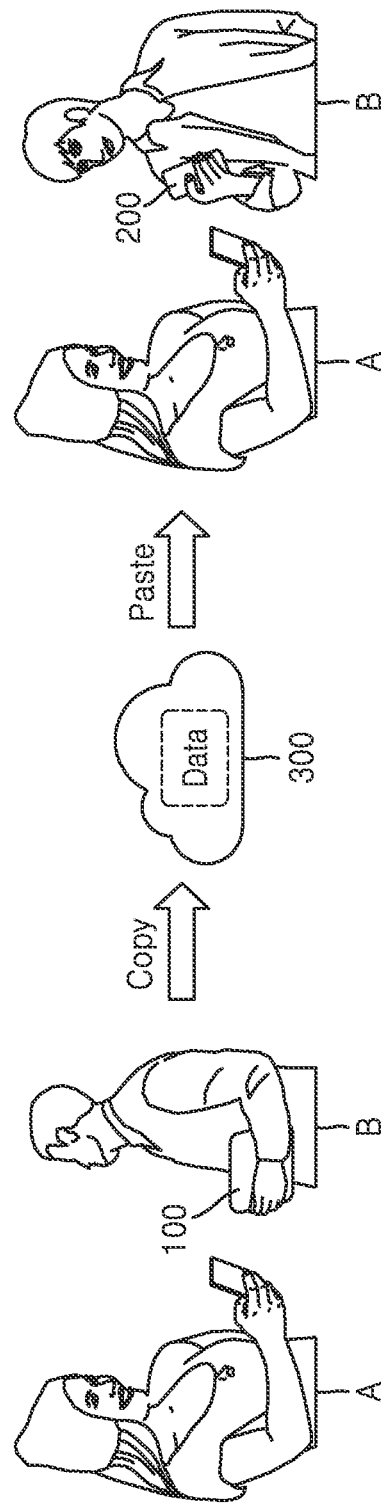
FIG. 16 is a view illustrating a method of exchanging data between devices, according to an embodiment of the disclosure.

FIG. 16 is a view illustrating a method of exchanging data between devices, according to an embodiment of the disclosure.

Referring to FIG. 16, according to the embodiment, when user A exchanges a business card or contact information with user B whom user A meets for the first time, the user A may share her own business card or contact information on the user A's own device (i.e., a first device 100) with a device (i.e., a second device 200) of the user B through two tapping operations.

A first tapping operation may be performed on the user A's business card or contact information on the screen of the device (i.e., the first device 100) held by the user A, and a second tapping operation may be performed on the screen of the device (i.e., the second device 200) held by the user B.

A method according to the disclosure may be executed by a processor, an application specific integrated circuit (ASIC), a field programmable gate array (FPGA), or a system-on-chip (SoC). In addition, the described method may be implemented by a storage medium that stores computer-executable instructions and, when executed by a processor in the computer, causes the method according to the disclosure to be executed.

The machine-readable storage medium may be provided as a non-transitory storage medium. The 'non-transitory storage medium' is a tangible device and only means that it does not contain a signal (e.g., electromagnetic waves). This term does not distinguish a case in which data is stored semi-permanently in a storage medium from a case in which data is temporarily stored. For example, the non-transitory recording medium may include a buffer in which data is temporarily stored.

According to an embodiment of the disclosure, a method according to various disclosed embodiments may be provided by being included in a computer program product. The computer program product, which is a commodity, may be traded between sellers and buyers. Computer program products are distributed in the form of device-readable storage media (e.g., compact disc read only memory (CD-ROM)), or may be distributed (e.g., downloaded or uploaded) through an application store (e.g., Play Store™) or between two user devices (e.g., smartphones) directly and online In the case of online distribution, at least a portion of the computer program product (e.g., a downloadable app) may be stored at least temporarily in a device-readable storage medium, such as a memory of a manufacturer's server, a server of an application store, or a relay server, or may be temporarily generated.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A method of exchanging data between devices, the method comprising:
by a first device:
detecting an intention of a user to transmit data;
generating, by using biometric data obtained from the user, a first private key and first identification information for the data;
encrypting the data by using the first private key, wherein the first private key is deleted after encrypting the data; and
transmitting the encrypted data and the first identification information to a personalized cloud storage; and
by a second device:
detecting an intention of the user to receive the data;
generating second identification information by using the biometric data obtained from the user;
requesting the personalized cloud storage for the data by using the second identification information; and
receiving and storing the data from the personalized cloud storage.

2. The method of claim 1,
wherein the generating of the second identification information comprises generating a second private key by using the biometric data obtained from the user, and
wherein the receiving and storing of the data from the personalized cloud storage comprises decrypting the data by using the second private key.

3. The method of claim 1, wherein the biometric data is data obtained by recognizing at least one of:
a fingerprint,
a face, or
an iris of the user.

4. A data exchange system comprising:
a personalized cloud storage;
a first device comprising a first transceiver, first memory storing one or more first computer programs, and one or more first processors communicatively coupled to the first transceiver and the first memory, wherein the one or more first computer programs include first computer-executable instructions that, when executed by the one or more first processors individually or collectively, cause the first device to:
detect an intention of a user to transmit data,
generate, by using biometric data obtained from the user, a first private key and first identification information for the data,
encrypt the data by using the first private key, wherein the first private key is deleted after encrypting the data, and
transmit the encrypted data and the first identification information to the personalized cloud storage; and
a second device comprising a second transceiver, second memory storing one or more second computer programs, and one or more second processors communicatively coupled to the second transceiver and the second memory, wherein the one or more second computer programs include second computer-executable instructions that, when executed by the one or more second processors individually or collectively, cause the second device to:
detect an intention of the user to receive the data,
generate second identification information by using the biometric data obtained from the user,
request the personalized cloud storage for the data by using the second identification information, and
receive and store the data from the personalized cloud storage.

5. The data exchange system of claim 4,
wherein the first computer-executable instructions that, when executed by the one or more first processors individually or collectively, cause the first device to generate a second private key by using the biometric data obtained from the user, and
wherein the second computer-executable instructions that, when executed by the one or more second processors individually or collectively, cause the second device to decrypt the data by using the generated second private key.

6. The data exchange system of claim 4, wherein the biometric data is data obtained by recognizing at least one of:
a fingerprint,
a face, or
an iris of the user.

7. The data exchange system of claim 4, wherein the biometric data is prohibited from being read and stored by another application or another device.

8. The data exchange system of claim 4, wherein use or non-use of the data exchange system is managed in settings of the first device or the second device.

9. The data exchange system of claim 4, wherein the first computer-executable instructions that, when executed by the one or more first processors individually or collectively, cause the first device to detect an intention of the user to transmit the data by receiving the user's input of tapping the data.

10. The data exchange system of claim 4, wherein the second computer-executable instructions that, when executed by the one or more second processors individually or collectively, cause the second device to detect an intention of the user to receive the data by receiving the user's input of tapping a location where to receive the data.

11. The data exchange system of claim 4,
wherein the personalized cloud storage receives and stores the data and the first identification information from the first device, and
wherein the personalized cloud storage, in response to a request for the second identification information and the data from the second device, matches the second identification information with the first identification information and transmits the data to the second device.

12. A method, performed by a personalized cloud storage, of exchanging data between devices, the method comprising:
receiving, from a first device, first identification information generated using biometric data of a user of the first device and data, wherein the data is encrypted by using a first private key and the first private key is deleted after encrypting the data;
storing the data and the first identification information on the personalized cloud storage;
receiving, by the personalized cloud storage, second identification information generated by a second device using biometric data of a user of the second device and a request for the data from the second device;
comparing, by the personalized cloud storage, the second identification information with the first identification information; and
transmitting the data to the second device when the second identification information is identical with the first identification information,
wherein the personalized cloud storage is accessible to the first device according to device default settings of the first device without a separate user registration procedure.

13. A non-transitory computer-readable recording medium having recorded thereon a computer program, which, when executed by a computer, performs the method of claim 1.

14. The method of claim 2, wherein the second device is further configured to delete the second private key after decrypting the data.

15. The method of claim 12, wherein the personalized cloud storage is accessible to the second device according to device default settings of the second device without a separate user registration procedure.

16. The method of claim 12, wherein the second device comprises one of a TV, a digital picture frame, or a home appliance.

17. The method of claim 12, further comprising:
transmitting a failure message to the second device when the second identification information is not identical with the first identification information.

18. The method of claim 12,
wherein a second private key is generated with the second identification information by using the biometric data obtained from the user of the second device, and wherein the data transmitted to the second device is decrypted by using the second private key.

* * * * *